(12) United States Patent
Byrnes et al.

(10) Patent No.: US 9,505,491 B2
(45) Date of Patent: Nov. 29, 2016

(54) HELICOPTER COMPOSITE BLADE SPAR AND METHOD

(75) Inventors: Francis Edward Byrnes, White Plains, NY (US); Jacob A. Fehrman, Lexington, KY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 757 days.

(21) Appl. No.: 13/213,591

(22) Filed: Aug. 19, 2011

(65) Prior Publication Data
US 2012/0045344 A1 Feb. 23, 2012

Related U.S. Application Data

(60) Provisional application No. 61/375,165, filed on Aug. 19, 2010.

(51) Int. Cl.
| | | |
|---|---|---|
| *B64C 27/473* | (2006.01) | |
| *B29C 70/08* | (2006.01) | |
| *B29C 70/30* | (2006.01) | |
| *B29L 31/08* | (2006.01) | |

(52) U.S. Cl.
CPC ........... *B64C 27/473* (2013.01); *B29C 70/083* (2013.01); *B29C 70/30* (2013.01); *B29L 2031/082* (2013.01); *B64C 2027/4736* (2013.01); *Y10T 156/10* (2015.01)

(58) Field of Classification Search
CPC ............... B64C 27/473; B64C 2027/4733; B64C 2027/4736; F05D 2230/31
USPC ............. 416/223 R, 226, 229 R, 233, 241 A, 416/241 R
See application file for complete search history.

(56) References Cited

U.S. PATENT DOCUMENTS

| | | | |
|---|---|---|---|
| 3,217,807 A * | 11/1965 | Underhill, Jr. ........ | B64C 27/473 244/123.6 |
| 3,713,751 A * | 1/1973 | Fradenburgh et al. ......... | 416/87 |
| 3,765,124 A * | 10/1973 | Ferris et al. .................. | 416/226 |
| 3,967,996 A * | 7/1976 | Kamov et al. ................ | 156/156 |
| 4,051,289 A * | 9/1977 | Adamson ............... | B29C 70/08 156/227 |
| 4,095,322 A * | 6/1978 | Scarpati et al. ............. | 29/889.6 |
| 4,264,278 A * | 4/1981 | Weingart ...................... | 416/226 |
| 4,298,417 A * | 11/1981 | Euler et al. .................... | 156/228 |
| 4,316,701 A * | 2/1982 | Scarpati et al. ............. | 416/226 |
| 4,650,534 A * | 3/1987 | Mussi et al. .................. | 156/245 |
| 4,657,615 A * | 4/1987 | Braun et al. .................. | 156/245 |
| 5,087,187 A * | 2/1992 | Simkulak ............... | B29C 43/32 264/258 |
| 5,248,242 A * | 9/1993 | Lallo et al. .................... | 416/226 |
| 5,439,353 A * | 8/1995 | Cook et al. .................... | 416/230 |
| 5,621,967 A * | 4/1997 | Frengley et al. ............ | 29/889.6 |
| 5,755,558 A * | 5/1998 | Reinfelder et al. ........... | 416/230 |
| 5,939,007 A * | 8/1999 | Iszczyszyn et al. .......... | 264/258 |
| 6,659,722 B2 * | 12/2003 | Sehgal et al. ............. | 416/134 A |
| 6,708,921 B2 * | 3/2004 | Sims et al. .................. | 244/17.11 |
| 7,749,421 B2 * | 7/2010 | Callis .................... | B29C 33/485 264/313 |
| 2008/0295755 A1* | 12/2008 | Weimer .................... | 112/475.08 |
| 2009/0189325 A1* | 7/2009 | Callis et al. .................... | 269/50 |

\* cited by examiner

*Primary Examiner* — Sean J Younger
(74) *Attorney, Agent, or Firm* — Cantor Colburn LLP

(57) ABSTRACT

A composite spar for a helicopter blade includes two or more layers of unidirectional laminate material. One or more upper plies of bi-directional laminate extend from an upper airfoil portion of the spar disposed between adjacent layers of the two or more layers of unidirectional laminate material. One or more lower plies of bi-directional laminate material extend from a lower airfoil portion of the spar disposed between adjacent layers of the two or more layers of unidirectional material. The upper plies and the lower plies overlap defining a crackstopper layer configured to prevent propagation of defects in the spar.

7 Claims, 3 Drawing Sheets

HELICOPTER COMPOSITE BLADE SPAR AND METHOD

CROSS-REFERENCES TO RELATED APPLICATION

This patent application claims priority to U.S. Provisional Patent Application Ser. No. 61/375,165 filed Aug. 19, 2010, which is incorporated herein by reference in its entirety.

BACKGROUND OF THE INVENTION

The subject matter disclosed herein relates to helicopter blades. More specifically, the subject disclosure relates to construction and methodology of construction of a composite spar for helicopter blades.

Typical helicopter composite blade spars have spanwise and chordwise stiffness and structural requirements. The upper and lower airfoils of the blade are generally the most effective in generating the high bending and axial stiffnesses required for spanwise bending and centrifugal loading conditions. This results in the incorporation of unidirectional graphite and fiberglass plies in the blade spars in the spanwise direction. The total thickness and combination are a function of strength and dynamic requirements. Additionally, the torsional loading in the blade is most efficiently reacted by +/−45 degree graphite which result in a torque reaction in the chordwise direction around the airfoil. Therefore a typical helicopter blade will have a +/−45 degree graphite ply laminate at inner and outer mold lines of the blade.

Typical helicopter composite blade spars are fabricated over a foam mandrel encased in a rubber bladder by a layup process of multiple plies of composite material. The assembly is put in a metal mold and external temperature and pressure from the rubber bladder cures the composite laminate. During the ply layup process, individual plies are not overlapped at a trailing edge backwall region for ease of fabrication. This process, as shown in FIG. 3, leads to overlapping an entire upper airfoil laminate 100 with an entire lower airfoil laminate 102 creating a scarf joint 104 at a backwall 106 of the composite spar. This leads to a spar backwall resin plane extending from the upper airfoil laminate 100 to lower airfoil laminates 102. The torsional loading in the chordwise direction of the spar subjects the weak resin plane to critical interlaminar stresses not using the high strength of the composite fibers. A crack initiation or manufacturing defect could cause a sudden disbond of the entire backwall scarf joint 104 leading to serious consequences for the safety and structural integrity of the composite blade.

BRIEF DESCRIPTION OF THE INVENTION

According to one aspect of the invention, a composite spar for a helicopter blade includes two or more layers of unidirectional laminate material. One or more upper plies of bi-directional laminate extend from an upper airfoil portion of the spar disposed between adjacent layers of the two or more layers of unidirectional laminate material. One or more lower plies of bi-directional laminate material extend from a lower airfoil portion of the spar disposed between adjacent layers of the two or more layers of unidirectional material. The upper plies and the lower plies overlap defining a crackstopper layer configured to prevent propagation of defects in the spar.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
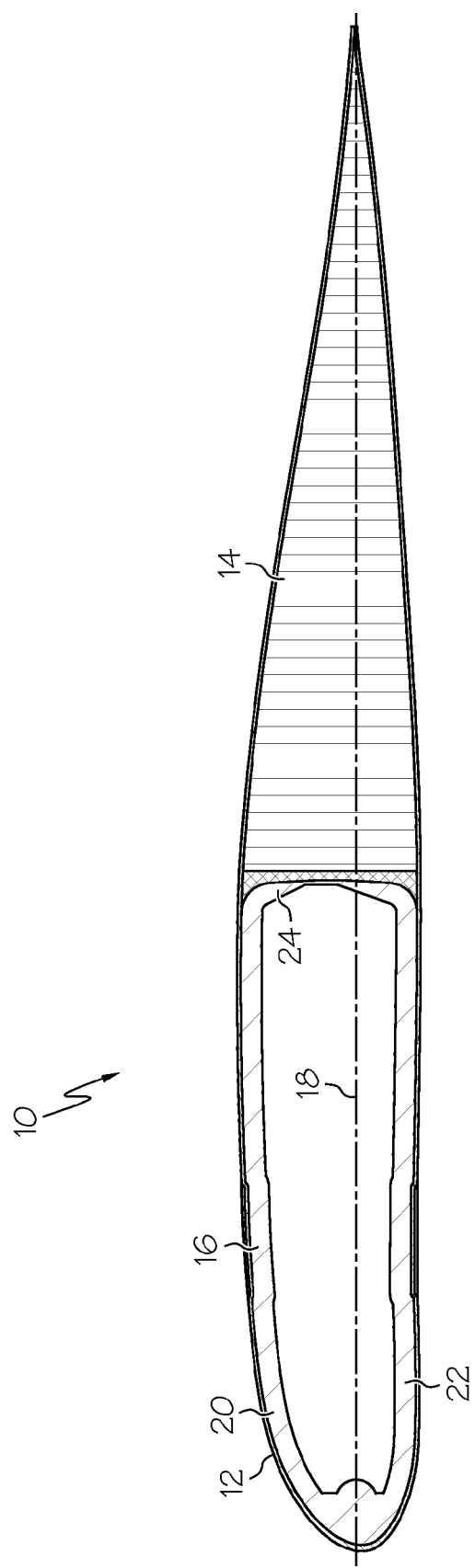
FIG. 1 is a cross-sectional view of an embodiment of a helicopter blade.

Shown in FIG. 1 is a cross-sectional view of a helicopter blade 10. The blade 10 includes a leading edge portion 12 and a trailing edge portion 14. One or more spars 16 are located along a chord 18 of the blade 10 and extend in a substantially spanwise direction along the blade 10. The spar 16 includes an upper airfoil portion 20, a lower airfoil portion 22 and a backwall 24 fabricated together as a composite laminate.

Figure 2:
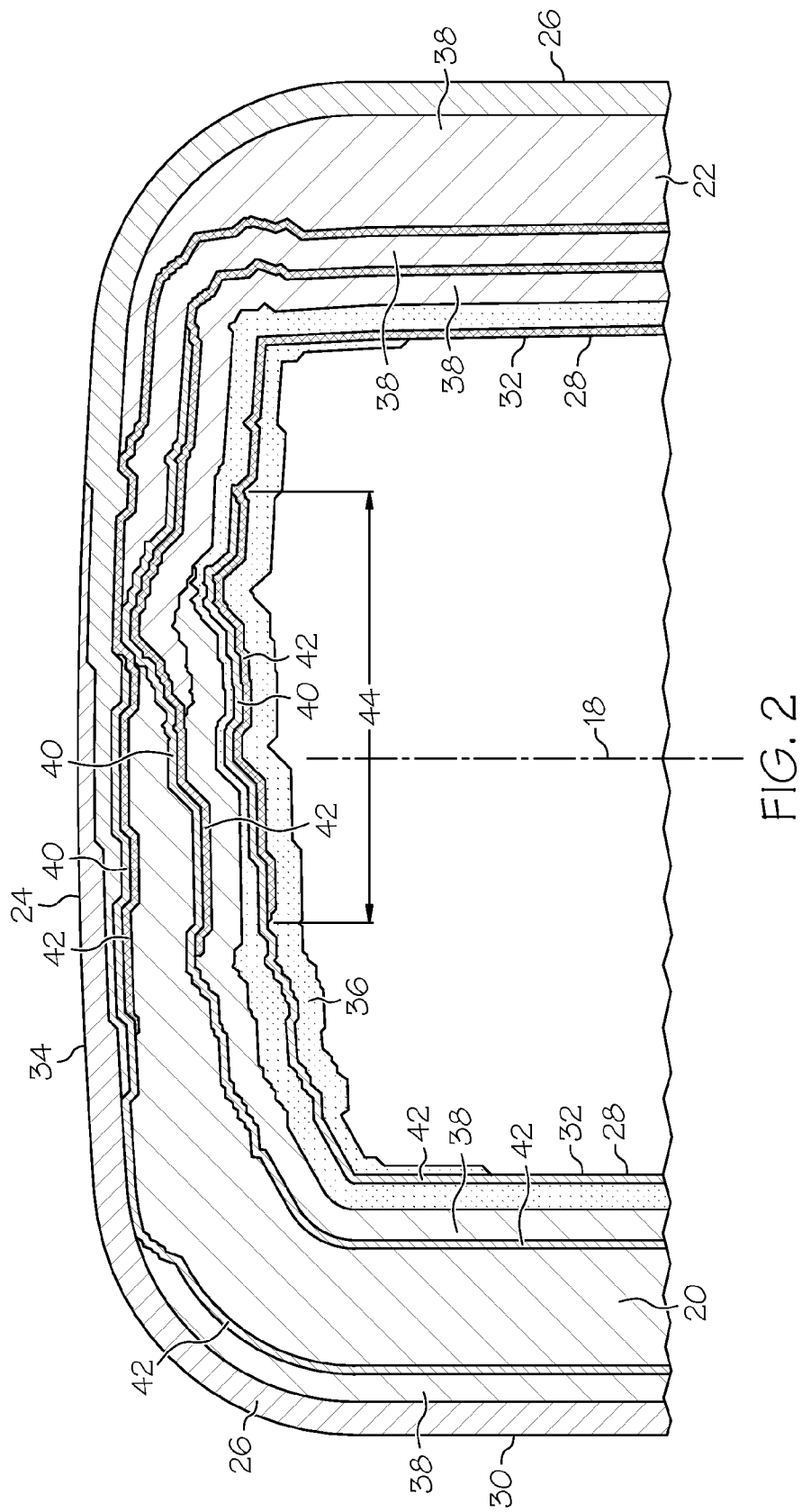
FIG. 2 is a cross-sectional view of an improved spar construction for a helicopter blade.
Figure 3:
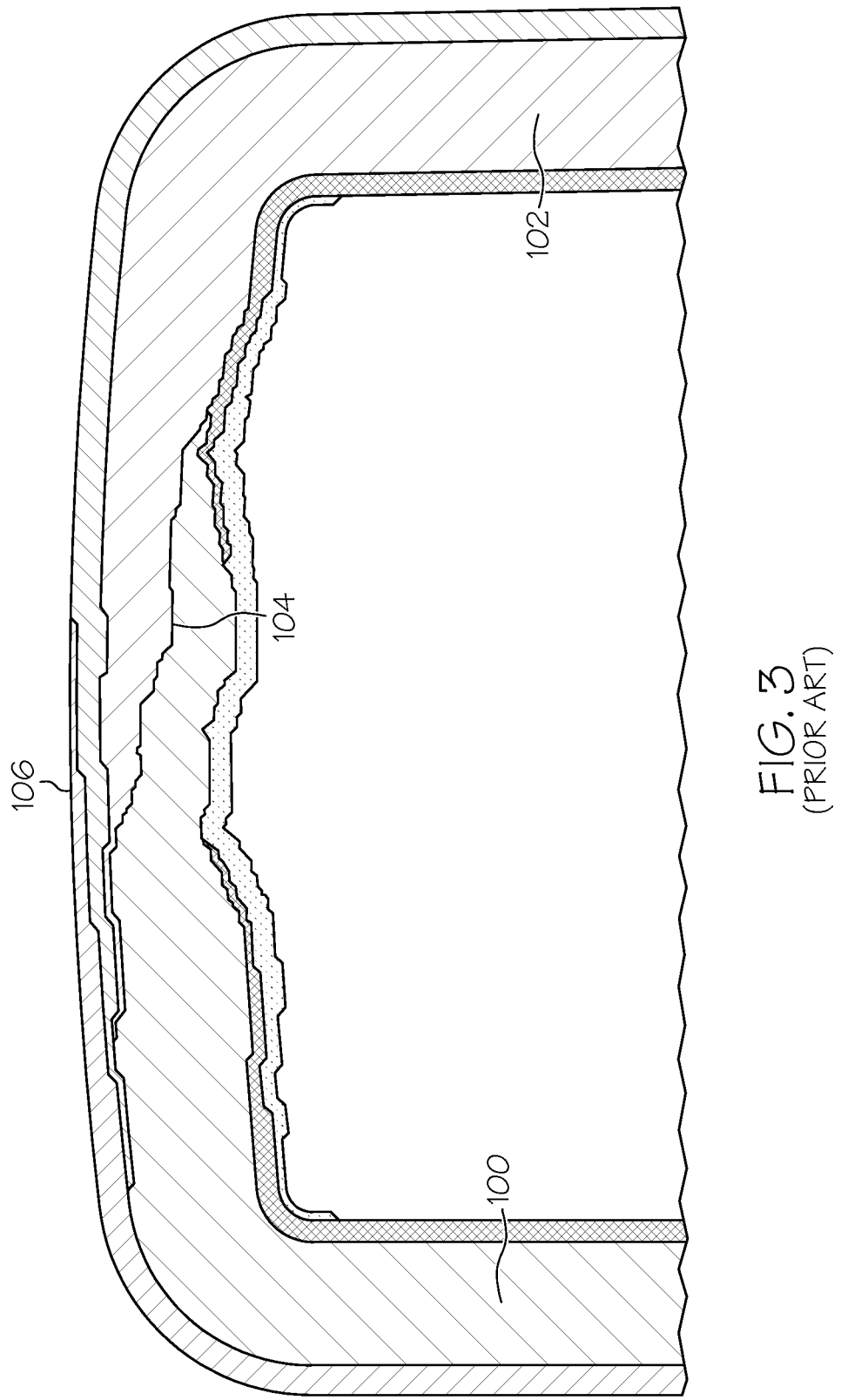
FIG. 3 is a cross-sectional view of a prior art spar construction for a helicopter blade.

FIG. 2 is a rotated view of the backwall 24 of the spar 16. The upper airfoil portion 20 includes an outer layer 26 of a +/−45 degree graphite ply laminate and an inner layer 28 of a +/−45 degree graphite ply laminate. The outer layer 26 and the inner layer 28 define an outer surface 30 and inner surface 32, respectively. Likewise the lower airfoil portion 22 includes an outer layer 26 of a +/−45 degree graphite ply laminate and an inner layer 28 of a +/−45 degree graphite ply laminate defining an outer surface 30 and inner surface 32. The outer layers 26 of the upper airfoil 20 and the lower airfoil 22 extend to and overlap at the backwall 24 to define an outer backwall surface 34. Similarly, the inner layers 28 of the upper airfoil 20 and the lower airfoil 22 extend to and overlap at the backwall 24 to define an inner backwall surface 36. Extending between the outer layers 26 and the inner layers 28 are one or more intermediate layers 38 formed of unidirectional ply laminate.

The improved composite blade spar 16 provides one or more crack stopper layers 40, in some embodiments four crack stopper layers 40, in the backwall 24. Each crack stopper layer 40 includes at least two plies 42 of +/−45 degree graphite material adjacent to each other in the spar 16 construction and which overlap at the backwall 24 to form the crackstopper layer 40. As shown in FIG. 2, the plies 42 extend from the upper airfoil portion 20 and/or the lower airfoil portion 22 toward the backwall 24. A first crackstopper layer 42 is provided at the inner surface 36 and others may be located between adjacent intermediate layers 38. The outer surface 34 may define another crackstopper layer 42. This eliminates a single resin interlaminar delamination plane for a crack to propagate along by requiring the crack path to alternately proceed toward the upper airfoil portion 20 across the resin plane along the crackstopper layers 42 and then proceed downward toward the lower airfoil portion 22 thus creating a stopping process for the delamination. To achieve the desired crack propagation prevention, a length 44 of overlap may vary between the crackstopper layers 42. Further, a position of the overlap relative to the chord 18 may be varied to achieve the desired crack propagation prevention.

To determine the length 44 of the overlap for a particular crackstopper layer 42, a shear lag analysis can be used. The overlap must be of significant length 44 such that a peak interlaminar stress in the resin bond between the crack stopper layers 42 is sufficiently low to provide a structurally adequate torsional transfer through the crack stopper layers 42.

The following example illustrates the analysis procedure. For +/−45 IM7/SP381 graphite/resin the principal material properties are given by:

| E11 = 2,479,218 psi | E22 = 2,479,218 psi | G12 = 5723,031 psi | µ12 = .799 |
|---|---|---|---|

For a main rotor spar 16 of a helicopter with a peak torsional moment of 17,000 inch-pounds, a total thickness of +/−45 degree plies of 0.144 inches, and an enclosed torsion area of 12.5 square inches, the corresponding torsional stress in the +/−45 graphite plies is $\tau 11=4,727$ psi. The torsional stress generates a peak interlaminar shear stress in the resin between the crackstopper layers 42 of $\tau klmax=1,137$ psi, with a required decay length of 0.10 inches for a total overlap length 44 of 0.20 inches.

Alternatively, when manufacturing defects, such as delaminations, are accepted in the composite spar 16 manufacture, the following method can be used to determine a unique overlap length 44 of the crackstopper layers 42 to preclude the propagation of a manufacturing delamination. For material like +/−45 IM7/SP381graphite/resin composite, a strain energy-release rate for E08cycles of torsional loading is GIImax=1.0 inch-pound per inch for room temperature dry conditions. The environmental and material statistical scatter give a working GIImax of 0.705 inch-pounds per inch. Using interlaminar fracture mechanics analysis, the strain-energy release rate of the composite spar 16, and torsional loading of the spar 16 is determined by:

$$GII_{crackstopper}=(PI*\tau klmax^2*A)/(Eresin* (1+\mu resin)) \text{ Where Eresin}=1,330,000 \text{ psi}$$
$\mu resin=0.335 \text{ PI}=3.1416 \tau klmax=1,137 \text{ psi and}$
$GII_{crackstopper}=0.705 \text{ in-lb/in}$ which results in a maximum delamination length A of 0.3 inches for the particular composite spar 16. For this spar 16, the maximum manufacturing delamination would be 0.3 inches requiring a total crackstopper layer 42 overlap length 44 of 0.3+0.1+0.1=0.5 inches.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A composite spar for a helicopter blade comprising:
   first and second upper layers of unidirectional laminate material extending from an upper airfoil portion of the spar and terminating at a backwall portion of the spar between the upper airfoil portion and a lower airfoil portion;
   first and second lower layers of unidirectional laminate material extending from the lower airfoil portion of the spar and terminating at the backwall portion, the first upper layer of unidirectional laminate material overlapping the first lower layer of unidirectional laminate material at the backwall portion;
   a first ply of bi-directional laminate extending from the upper airfoil portion of the spar and terminating at the backwall portion, the first ply of bi-directional laminate disposed between the first and second upper layers of unidirectional laminate material; and
   a second ply of bi-directional laminate material extending from the lower airfoil portion of the spar and terminating at the backwall portion, the second ply of bi-directional laminate material disposed between the first and second lower layers of unidirectional laminate material;
   wherein the first ply of bi-directional laminate and the second ply of bi-directional laminate overlap at the backwall portion between the first upper layer of unidirectional laminate and the second lower layer of unidirectional laminate defining at least one crackstopper layer configured to prevent propagation of defects in the spar, and wherein a length of overlap of the first ply of bi-directional laminate and the second ply of bi-directional laminate is different than a length of overlap of the first upper layer of unidirectional laminate material and the first lower layer of unidirectional laminate material.

2. The composite spar of claim 1, wherein the upper airfoil portion comprises a first outer layer of bidirectional laminate material and the lower airfoil portion comprises a second outer layer of bidirectional laminate material.

3. The composite spar of claim 2, wherein the first outer layer of bidirectional laminate material and the second outer layer of bidirectional laminate overlap at the backwall portion of the spar.

4. The composite spar of claim 1, wherein at least one of the upper airfoil portion and the lower airfoil portion include an inner layer comprising one or more plies of bidirectional laminate material.

5. The composite spar of claim 4, wherein the inner layer comprises a crackstopper layer.

6. The composite spar of claim 4, wherein the inner layer comprises one or more plies of bidirectional laminate material disposed at the upper airfoil portion, and one or more plies of bidirectional laminate material disposed at the lower airfoil portion.

7. The composite spar of claim 6, wherein the one or more plies of bidirectional laminate material disposed at the upper airfoil portion and the one or more plies of bidirectional laminate material disposed at the lower airfoil portion overlap at the backwall portion of the spar.

* * * * *